United States Patent [19]

Hahn

[11] Patent Number: 5,468,183
[45] Date of Patent: Nov. 21, 1995

[54] CLEAN AIR OPERATOR ENCLOSURE

[75] Inventor: Kent S. Hahn, Evansville, Ind.

[73] Assignee: Hahn, Inc., Evansville, Ind.

[21] Appl. No.: 187,252

[22] Filed: Jan. 27, 1994

[51] Int. Cl.$^6$ ................................................ B60H 3/06
[52] U.S. Cl. .................... 454/136; 454/138; 454/158
[58] Field of Search .............................. 454/136, 138, 454/158

[56] References Cited

U.S. PATENT DOCUMENTS

| | | |
|---|---|---|
| 2,537,278 | 1/1951 | Patterson . |
| 2,627,217 | 2/1953 | Hainke et al. . |
| 2,700,927 | 2/1955 | Jordan . |
| 2,817,281 | 12/1957 | Schwan et al. . |
| 2,837,020 | 6/1958 | Gaspardo . |
| 2,987,980 | 6/1961 | Winn ................................. 454/138 |
| 3,126,810 | 3/1964 | Karlsson et al. . |
| 3,372,911 | 3/1968 | Herboldsheimer ................. 261/24 |
| 3,472,147 | 10/1969 | Grasseler . |
| 3,524,398 | 8/1970 | Winfrey ............................. 454/136 |
| 3,657,992 | 4/1972 | Minnick, Jr. ....................... 454/136 |
| 4,048,910 | 9/1977 | Weir ................................... 454/136 |
| 4,079,985 | 3/1978 | Martin .......................... 454/136 X |
| 4,308,222 | 12/1981 | Goettel et al. ..................... 261/117 |
| 5,277,655 | 1/1994 | Storkan et al. ..................... 454/143 |

FOREIGN PATENT DOCUMENTS

| | | | |
|---|---|---|---|
| 2128987 | 1/1973 | Germany ............................ 454/136 |

OTHER PUBLICATIONS

Engineered Air division of Thermal Components, Inc. leaflet entitled "Spray–Safe®".

Primary Examiner—Harold Joyce
Attorney, Agent, or Firm—R. Lawrence Buckley

[57] ABSTRACT

An operator enclosure (12) for a commercial sprayer (10). A preferred enclosure (12) includes glass panels (30,32,34) only in the upper portion of the enclosure such that a fairly large gap is formed between the lower edges of the glass panels (30,32,34) and the chassis (16) of the sprayer (10). This gap enhances ventilation of the operator cab, particularly when the cab is pressurized by means of a blower-powered air cleaning system.

19 Claims, 3 Drawing Sheets

CLEAN AIR OPERATOR ENCLOSURE

FIELD OF THE INVENTION

This invention generally relates to vehicle-mounted or vehicle-towed chemical spraying equipment, and relates more particularly to protective enclosures for the operators of such equipment.

BACKGROUND OF THE INVENTION

Commercial spraying equipment is well known. The present invention relates to commercial/professional spray systems mounted on or towed by tractors or special purpose vehicles. Such spray systems can be used for applying pesticides and fertilizers, for example. Typically a concentrated chemical is mixed with water in a large tank (approx. 100 gallons) which is carried or towed by the vehicle. A sprayer pump, usually powered off of the vehicle prime mover, pressurizes the solution and provides it to one or more spray booms, each of which carries a plurality of spray nozzles which collectively direct the solution, under pressure, toward the ground. The present invention will be discussed primarily in terms of spraying pesticides, but it should be noted that by no means is the present invention limited to pesticide sprayers.

During operation of a commercial spray system, the air surrounding the spray vehicle and the available breathing air for the operator can become contaminated with pesticides, pollen and other fine dusts and vapors. The level of contamination and the seriousness of the problem depend on a variety of factors including the type of solution being dispensed, the wind speed and direction, the speed of the spray vehicle, and the ambient dust levels.

One proposed solution to the contaminated air problem is to provide a filter mask (i.e., a breathing mask that covers the mouth and nose) to each operator of the equipment. Face masks filter out some substances, e.g., dust and pollen, to some degree, but they are not as effective with other substances, e.g., pesticides and ammonia fumes. And getting a breathing mask to fit properly and comfortably is difficult, at best. Also, operators might forget to wear their breathing masks.

Another proposed solution to the contaminated air problem is to use a completely closed cab. Such cabs are completely enclosed by glass windows but usually have a ventilation system for pressurizing the cab in an attempt to keep fumes and dust out of the cab. While useful in some situations, a completely enclosed cab has its own set of problems. For one thing, some operators simply do not like being completely enclosed by glass. Also, when the operator opens the door of a closed cab, dust and fumes can, in some situations, literally pour through the doorway into the cab. Once the inside of the cab becomes contaminated, it may be some time before the ventilation system adequately "scrubs" the air, given the fact that such a ventilation system is typically designed to operate in a dirty outside air environment rather than a dirty inside air environment. Of course, in some conditions a closed cab can also become excessively stuffy and warm, even if the glass is tinted and the ventilation system is normally sufficient to the task.

The present invention is designed to improve upon the face mask and closed cab "solutions" to the contaminated air problem.

SUMMARY OF THE INVENTION

One embodiment of the present invention is an operator enclosure for a commercial spray vehicle, wherein the enclosure includes a plurality of generally vertical elongate uprights attached at their lower ends to the vehicle chassis and extending upwardly therefrom; a top cover attached to the upper ends of the uprights; and a plurality of substantially transparent panels spanning laterally between the uprights and extending downwardly from the top cover only part of the way to the chassis, such that when the operator is seated within the vehicle cab only his or her upper torso and head are surrounded by the panels and a substantial gap exists between the bottom edges of the panels and the chassis.

In another embodiment of the invention, the operator enclosure discussed above further includes an air filtering system operatively connected to the top cover, the air filtering system including an inlet air filter; a fan having an inlet and an outlet, the inlet being in fluid communication with the inlet air filter; and a plenum in fluid communication with the outlet of the fan, the plenum forming a plurality of apertures arranged and configured to direct a curtain of filtered air generally downwardly within the cab to continuously refresh the cab with filtered air.

BRIEF DESCRIPTION OF THE DRAWINGS

The invention will be further described with reference to the appended Drawings, wherein.

DETAILED DESCRIPTION OF THE PREFERRED EMBODIMENT

Figure 1:
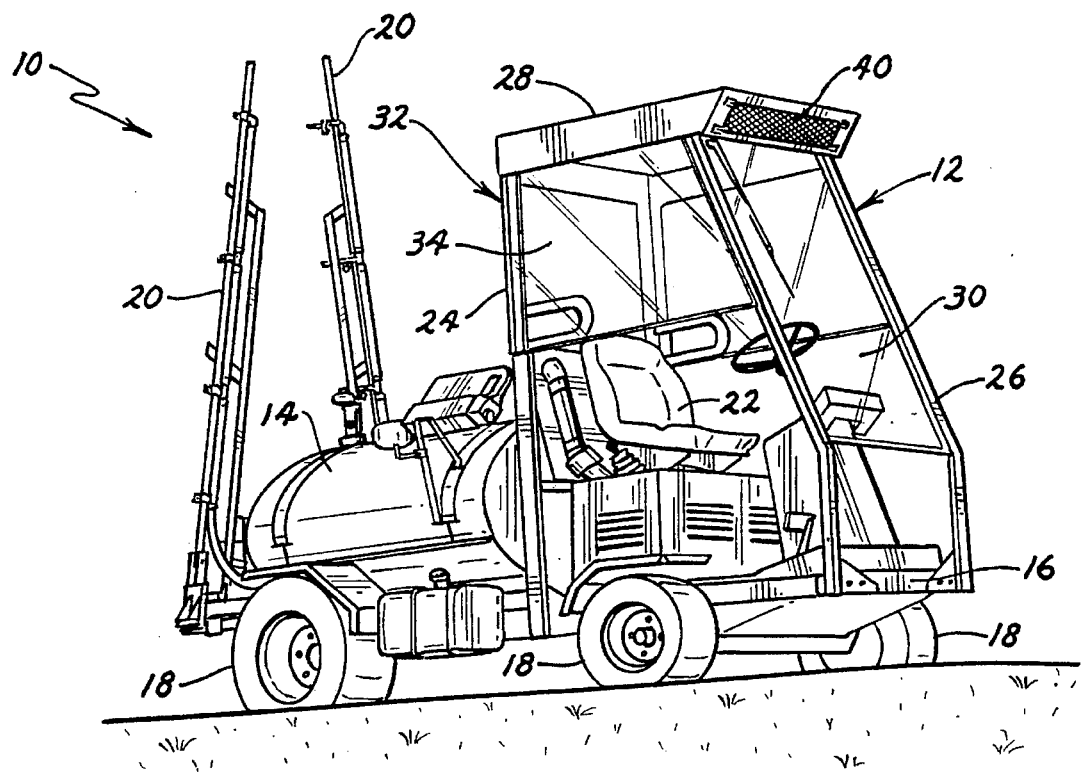
FIG. 1 is a perspective view of a commercial spray vehicle, including a preferred embodiment of the clean air operator enclosure of the present invention.

Reference is now made to the appended drawings, wherein like reference numerals designate like components and assemblies throughout the several views. FIG. 1 shows a perspective view of a turf sprayer 10 including a clean air operator enclosure 12 according to the present invention. Sprayer 10 is preferably though not necessarily in the form of a general purpose utility vehicle (e.g., one of the Multi Pro (R) vehicles manufactured by Hahn, Inc., Evansville, Ind., the present assignee) outfitted with a spray system. Sprayer 10 includes its own spray solution tank 14 supported by a vehicle frame 16 which in turn is carried in conventional manner by a plurality of wheels 18, some or all of which are powered by the prime mover (not shown) of the vehicle. Mounted preferably toward the rear of sprayer 10 are spray booms 20 (shown in their upright, transport positions in FIG. 1), and toward the front of the vehicle is an operator seat 22 located within operator cab. Various vehicle and spray system controls (not shown) are typically located in the cab. Operator enclosure 12 is configured to generally surround the upper half of the cab, but it is not an enclosed cab in the sense of a cab which has a frame supporting a plurality of transparent panels which more or less seal off the operator from the outside air.

Operator enclosure 12 includes a frame having two rear substantially straight and vertical uprights 24; and two front, generally vertical but somewhat angled uprights 26. All four uprights 24, 26 are secured at their lower ends to vehicle chassis 16, and are spaced from each other to form a generally rectangular cab, when viewed from the top. Secured to the upper ends of uprights 24, 26 is a rectangular and substantially horizontal cover assembly 28. Spanning between the two front uprights 26 is a windshield panel 30; spanning between rear uprights 24 is a rear window panel 32; and spanning between each rear upright 24 and the corresponding front upright 26 is a side window panel 34. It should be noted that glass panels 30, 32 and 34 all preferably extend only partially from top cover assembly 28 down to vehicle chassis 16. That is, the glass panels do not completely enclose the operator cab, but rather enclose only about the top half of the cab volume, such that when the operator is positioned in seat 22 his or her head and upper torso are located within the enclosure formed by the glass panels, with the operator's lower torso and legs located beneath the enclosure formed by the glass panels. That is, there is a gap of about one to three feet, preferably on the order of about 2 to 2½ feet, between the bottom edges of the transparent panels and the vehicle chassis 16. The reason for this rather large gap is discussed below.

It should be noted that enclosure 12 could be constructed in such a way as to provide roll over protection for the operator, although it is not necessary that it meet this requirement to fall within the contemplated invention.

FIG. 1 also illustrates a chemical spray filter 40 mounted on the forwardly inclined front surface of top cover assembly 28. Filter 40 can include any suitable filter media, but preferably includes media capable of handling the variety of pesticides, vapors, pollens and/or dusts normally encountered. Even more preferably, filter 40 would include a wire mesh prefilter, a micron paper particulate filter for pollen and other fine dusts, and an activated charcoal layer for absorbing or adsorbing potentially harmful chemical fumes. Such a filter can be purchased from Clean Air Filter, Defiance, Iowa as model number HN93V.

Figure 3:
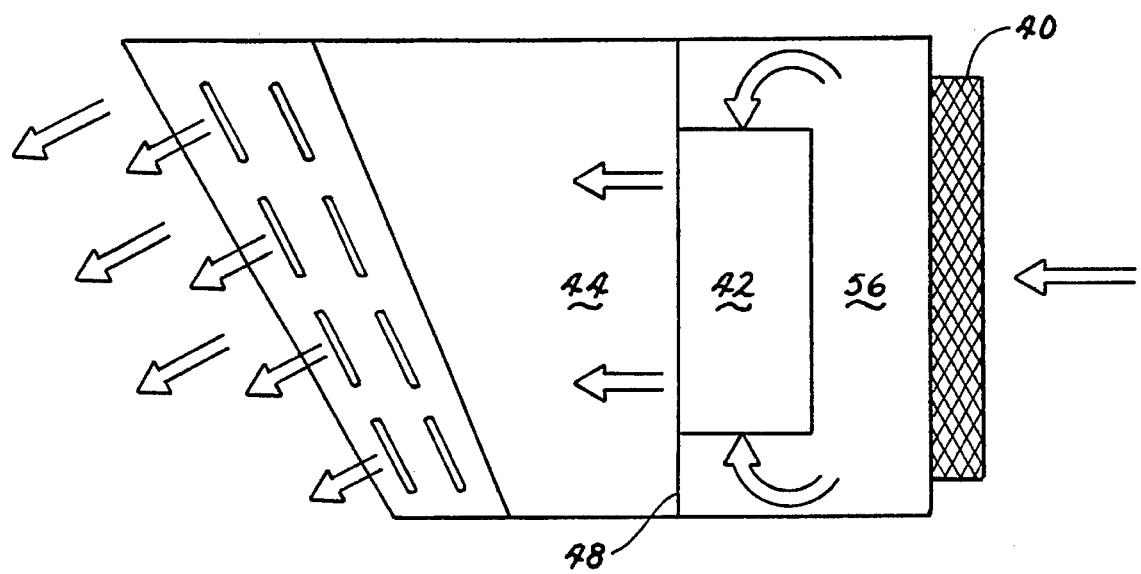
FIG. 3 is a pictorial/schematic view of the clean air operator enclosure of FIG. 1.

Referring to FIG. 3, a pictorial view of the air handling and filtering system of the present invention, filter 40 is the first of several components in the system. The next "active" component is a blower 42 which draws air through filter 40 and discharges it into a plenum 44. A plurality of slots 46 in plenum 44 permit the filtered air to flow into the operator cab in a generally uniform manner, forming a gentle "curtain" of air which constantly refreshes the operator's breathing air by in effect continuously scrubbing the air of particulates and fumes. The arrows in FIG. 3 generally represent air flow, although no representation is made that the air flow is precisely as indicated. Substantially vertical slots 46 (as viewed by the operator seated in the cab) preferably have a length of about 2 inches and a width of about 3/16 inch. There are preferably 19 such slots, and the slots are preferably spaced about 3⅞ inches apart, side to side, and about 3 inches apart, top to bottom (centerline to centerline in both cases). The reasoning behind the use of such slots is discussed below in greater detail.

Blower 42 is preferably a dual squirrel cage, 3-speed fan having an estimated operating point (at the highest speed) of 12 volts, 195 cfm, 10 amps, at 4000 rpm and 1.6" of water static pressure. Such a fan can be purchased from SGM Co. Inc., Mentor, Ohio. as Part No. B6006-12-C-LP.

Figure 2:
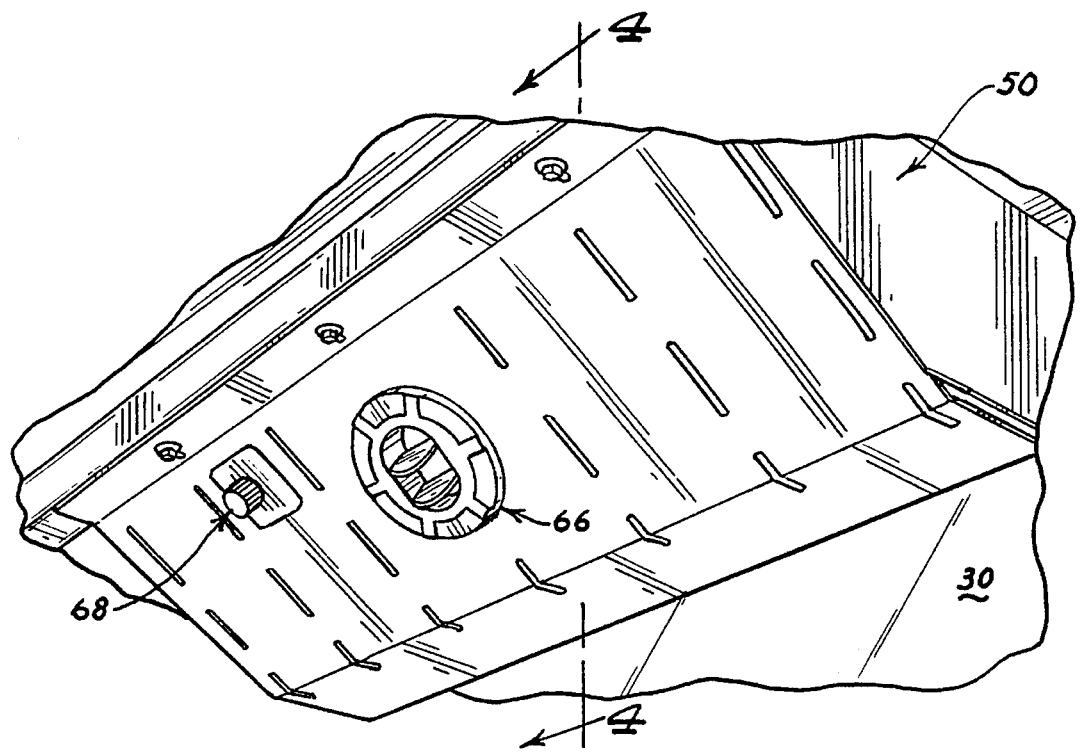
FIG. 2 is a perspective partial view of the inside of the operator enclosure of FIG. 1.
Figure 4:
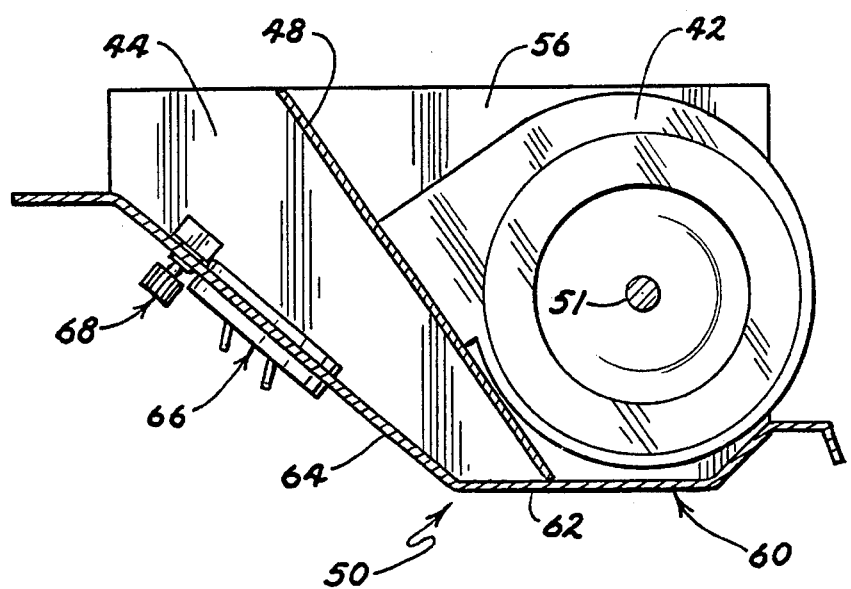
FIG. 4 is a sectional view of the blower housing assembly for the operator enclosure of FIG. 1, taken generally along line 4—4 of FIG. 2.
Figure 5:
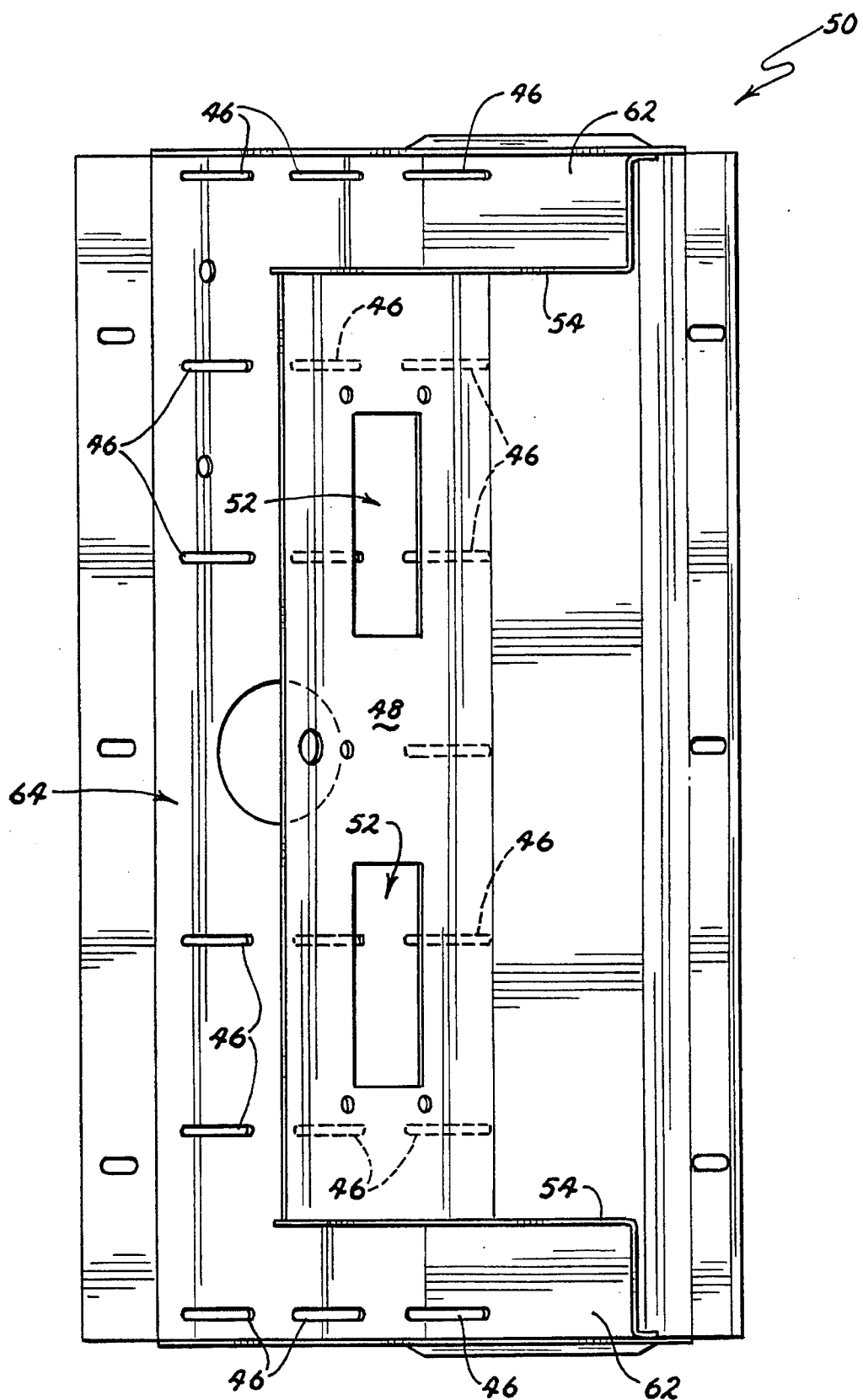
FIG. 5 is a top plan view of the blower housing assembly (with the blower, blower speed switch, and adjustable vent being removed for clarity) for the operator enclosure of FIG. 1.

Blower 42 is mounted on a panel 48 which is but one component of a blower housing 50 shown in sectional view in FIG. 4 and in top view in FIG. 5. In FIG. 4, only one of the squirrel cage blowers is shown, and the sectioned portion is a motor shaft 51 connecting the blower motor to one of the blowers. The preferred blower motor would actually have a shaft that would extend out of either end of the motor. In FIG. 5 various "active" components are removed for clarity; these components are shown in FIGS. 2 and 4. Blower panel 48 is simply a piece of sheet metal which is punched to create mounting roles for blower 42 and also to create relatively large rectangular apertures 52 which interconnect the pressure sides of the dual fans of blower 42 and plenum 44 established downstream of blower 42 and upstream of slots 46. Referring to FIG. 5, blower panel 48 is supported on either end by an end panel 54 spot welded to blower panel 48. Panels 48 and 54 combine to form a blower enclosure 56. The top of blower enclosure 56 is formed by the large sheet metal top of cover assembly 28 against which blower assembly 50 presses when the cover assembly 28 is assembled. Thus it can be seen that blower enclosure 56 is sealed except for the inlet formed by a filter aperture (an aperture, not shown, for permitting inlet air from filter 40 to enter blower enclosure 56) and the dual rectangular outlets 52 punched in blower panel 48. It can also be seen that the blower enclosure 56 is slightly narrower side-to-side than the overall blower housing 50 and is set within the blower housing 50.

FIGS. 2, 4 and 5 show a panel 60 which is the panel which forms slots 46. Panel 60 includes a fairly narrow (fore-and-aft), substantially horizontal subpanel 62 located toward the bottom front edge of cover assembly 28; and a wider (fore-and-aft), angled subpanel 64 which slopes upwardly and rearwardly from horizontal subpanel 62 to the ceiling of operator enclosure 12, i.e., the top panel of top cover assembly 28. Subpanel 64 is preferably set at about a 40 degree angle to the horizontal. The overall width of panel is preferably about 24 inches.

Panel 60 preferably includes a larger directional (adjustable) vent 50 similar to the type found on many automobiles, for directing a relatively large amount of air flow toward the operator's face, for example, to improve the operator's comfort.

Finally, panel 60 carries, toward its upper left hand corner, a 3-speed blower switch 68, so that the operator can vary the blower speed depending on conditions. Switch 68 is of course connected to blower 42 in a conventional manner. The power to operate blower 42 is preferably taken from the 12 VDC system of the vehicle.

The various panels that combine to form the blower housing are all preferably cold rolled sheet steel (16 GAs for example) welded together in conventional fashion.

The overall operation of the system can now be explained. Depending on conditions; the operator simply adjusts switch 68 to one of three positions to establish the speed of blower 42. Contaminated air is drawn through filter 40, thereby being "scrubbed," and into blower enclosure 56. This clean air then enters either of the squirrel cage blowers of blower 42, and is pressurized and directed through apertures 52 in panel 48 and into plenum 44. The pressure in plenum 44 would depend on the speed setting of blower 42, but at the highest speed of the preferred motors described above, the plenum pressure would be on the order of 1.6" water. This pressurized, clean air would then flow into the cab through directional vent 66 and slots 46. This air would flow downwardly over the operator, continuously "scrubbing" the air in the cabs and would easily flow out of the cab by exiting through the large gap between the lower edges of the transparent panels 30, 32, 34 and chassis 16. Applicant has discovered that by using a rather large flow exiting gap (e.g., 2 to 2½ feet) the flow rather smoothly flows out of the cab without creating unnecessary flow eddies or turbulence which can tend to actually exacerbate the problem by forcing contaminated air toward filter 40.

A preferred embodiment of the invention is described above. Those skilled in the art will recognize that many embodiments are possible within the scope of the invention. Variations and modifications of the various parts and assemblies can certainly be made and still fall within the scope of the invention. Thus, the invention is limited only to the apparatus and method recited in the following claims, and equivalents thereof.

I claim:

1. An operator enclosure for a commercial spray vehicle, the vehicle including a chassis and an operator cab, the enclosure comprising:
    (a) a plurality of generally vertical elongate uprights attached at their lower ends to the vehicle chassis and extending upwardly therefrom, establishing a generally rectangular operator enclosure configuration;
    (b) a generally rectangular top cover attached to the upper ends of the uprights; and
    (c) a plurality of substantially transparent panels spanning laterally between adjacent uprights and extending downwardly from the top cover only part of the way to the chassis, such that when the operator is seated within the cab only his or her upper torso and head are surrounded by the panels and a substantial gap exists between the bottom edges of the panels and the chassis, wherein a windshield panel is located toward the front of the operator enclosure and a side panel is located on each side of the operator enclosure, and wherein the windshield panel extends considerably below the side panels such that the bottom edges of the side panels are considerably higher than the bottom edge of the windshield panel.

2. The operator enclosure of claim 1, further comprising an air filtering system operatively connected to the top cover, comprising:
    (a) an inlet air filter;
    (b) a fan having an inlet and an outlet, the inlet being in fluid communication with the inlet air filter; and
    (c) a plenum in fluid communication with the outlet of the fan, the plenum forming an array of spaced apertures arranged and configured to direct a curtain of filtered air generally downwardly to continuously refresh the cab with filtered air.

3. The operator enclosure of claim 2, wherein the apertures are elongate slots.

4. The operator enclosure of claim 3, wherein each elongate slot is about 2 inches long and about 3/16 inch wide.

5. The operator enclosure of claim 4, wherein the elongate slots are spaced about 3⅞ inches apart, side to side, and about 3 inches apart, top to bottom.

6. The operator enclosure of claim 5, wherein the pressure within the plenum is on the order of 1.6 inches of water when the fan is operating.

7. The operator enclosure of claim 6, further comprising a directionally adjustable vent in the plenum for directing a relatively large amount of air flow toward the operator's face.

8. The operator enclosure of claim 2, wherein the plenum is formed in part by a panel member which comprises a fairly narrow substantially horizontal first subpanel located toward the windshield panel, and a wider, angled second subpanel which slopes upwardly and rearwardly from the first subpanel to the top cover of the operator enclosure.

9. The operator enclosure claim 3, wherein the elongate slots are aligned in such a way that they generally run fore-and-aft relative to the overall commercial spray vehicle.

10. The operator enclosure of claim 2, wherein the inlet air filter is positioned toward the front of the top cover.

11. The operator enclosure of claim 2, wherein the inlet air falter is of the type including activated charcoal.

12. An operator enclosure for a commercial spray vehicle, the vehicle including a chassis and an operator cab, the enclosure comprising:
    (a) a plurality of generally vertical elongate uprights attached at their lower ends to the vehicle chassis and extending upwardly therefrom, establishing a generally rectangular operator enclosure configuration;
    (b) a generally rectangular top cover attached to the upper ends of the uprights;
    (c) a plurality of substantially transparent panels spanning laterally between adjacent uprights and extending downwardly from the top cover only part of the way to the chassis, such that when the operator is seated within the cab only his or her upper torso and head are surrounded by the panels and a substantial gap exists between the bottom edges of the panels and the chassis;
    (d) an inlet air filter supported by the top cover;
    (e) a fan having an inlet and an outlet, the inlet being in fluid communication with the inlet air filter; and
    (f) a plenum in fluid communication with the outlet of the fan, the plenum forming an array of spaced apertures arranged and configured to direct a curtain of filtered air generally downwardly to continuously refresh the cab with filtered air.

13. The operator enclosure of claim 12, wherein the apertures are elongate slots.

14. The operator enclosure of claim 13, wherein each elongate slot is about 2 inches long and about 3/16 inch wide.

15. The operator enclosure of claim 14, wherein the elongate slots are spaced about 3⅞ inches apart, side to side, and about 3 inches apart, top to bottom.

16. The operator enclosure of claim 15, wherein the pressure within the plenum is on the order of 1.6 inches of water when the fan is operating.

17. The operator enclosure of claim 16, further comprising a directionally adjustable vent in the plenum for directing a relatively large amount of air flow toward the operator's face.

18. The operator enclosure of claim 12, wherein the plenum is formed in part by a panel member which comprises a fairly narrow substantially horizontal first subpanel located toward the windshield panel, and a wider, angled second subpanel which slopes upwardly and rearwardly from the first subpanel to the top cover of the operator enclosure.

19. The operator enclosure claim 18, wherein the elongate slots are aligned in such a way that they generally run fore-and-aft relative to the overall commercial spray vehicle.

* * * * *